(12) United States Patent
Bendel

(10) Patent No.: US 10,094,148 B2
(45) Date of Patent: Oct. 9, 2018

(54) CLOSING DEVICE FOR A MOTOR-VEHICLE HOOD, AND METHOD

(71) Applicant: Kiekert Aktiengesellschaft, Heiligenhaus (DE)

(72) Inventor: Thorsten Bendel, Oberhausen (DE)

(73) Assignee: Kiekert Aktiengesellschaft, Heiligenhaus (DE)

( * ) Notice: Subject to any disclaimer, the term of this patent is extended or adjusted under 35 U.S.C. 154(b) by 0 days.

(21) Appl. No.: 15/307,940

(22) PCT Filed: Apr. 30, 2015

(86) PCT No.: PCT/DE2015/000210
§ 371 (c)(1),
(2) Date: Dec. 6, 2016

(87) PCT Pub. No.: WO2015/165438
PCT Pub. Date: Nov. 5, 2015

(65) Prior Publication Data
US 2017/0096845 A1   Apr. 6, 2017

(30) Foreign Application Priority Data

Apr. 30, 2014   (DE) .......................... 10 2014 006 239

(51) Int. Cl.
*E05B 83/24* (2014.01)
*E05B 81/20* (2014.01)
(Continued)

(52) U.S. Cl.
CPC ............ *E05B 83/24* (2013.01); *B62D 25/105* (2013.01); *E05B 81/06* (2013.01); *E05B 81/20* (2013.01); *Y10S 292/14* (2013.01); *Y10S 292/23* (2013.01)

(58) Field of Classification Search
CPC .......... E05B 81/04; E05B 81/06; E05B 81/14; E05B 81/20; E05B 81/24; E05B 81/56;
(Continued)

(56) References Cited

U.S. PATENT DOCUMENTS 3,731,963 A * 5/1973 Pond ..................... E05B 83/24
292/144
3,937,505 A * 2/1976 Dempsey ............... E05B 47/00
292/201
(Continued)

FOREIGN PATENT DOCUMENTS

DE         3743282 A1 * 7/1989 ............. E05B 81/20
DE    100 33 092 A1    1/2002
(Continued)

OTHER PUBLICATIONS

International Search Report and Written Opinion for corresponding Patent Application No. PCT/DE2015/000210 dated Nov. 12, 2015.

*Primary Examiner* — Christine M Mills
(74) *Attorney, Agent, or Firm* — Renner, Otto, Boisselle & Sklar, LLP

(57) ABSTRACT

A closure device comprises a locking mechanism, which has a rotary latch and a pawl, and an electrical drive for opening the locking mechanism. The closure device has an actuating apparatus for actuating the electrical drive, such that the locking mechanism can be opened exclusively electrically. Thus, there is no mechanical system for enabling the locking mechanism to be opened exclusively in a mechanical manner. In the non-actuated state, the electrical drive is completely disconnected from the current-carrying electrical conductors. Thus, there is then no voltage on the drive, which must be used to open the locking mechanism. The actuating apparatus includes one or more electrical contacts that are closed to contact the electrical drive to a current (Continued)

Figure 1:
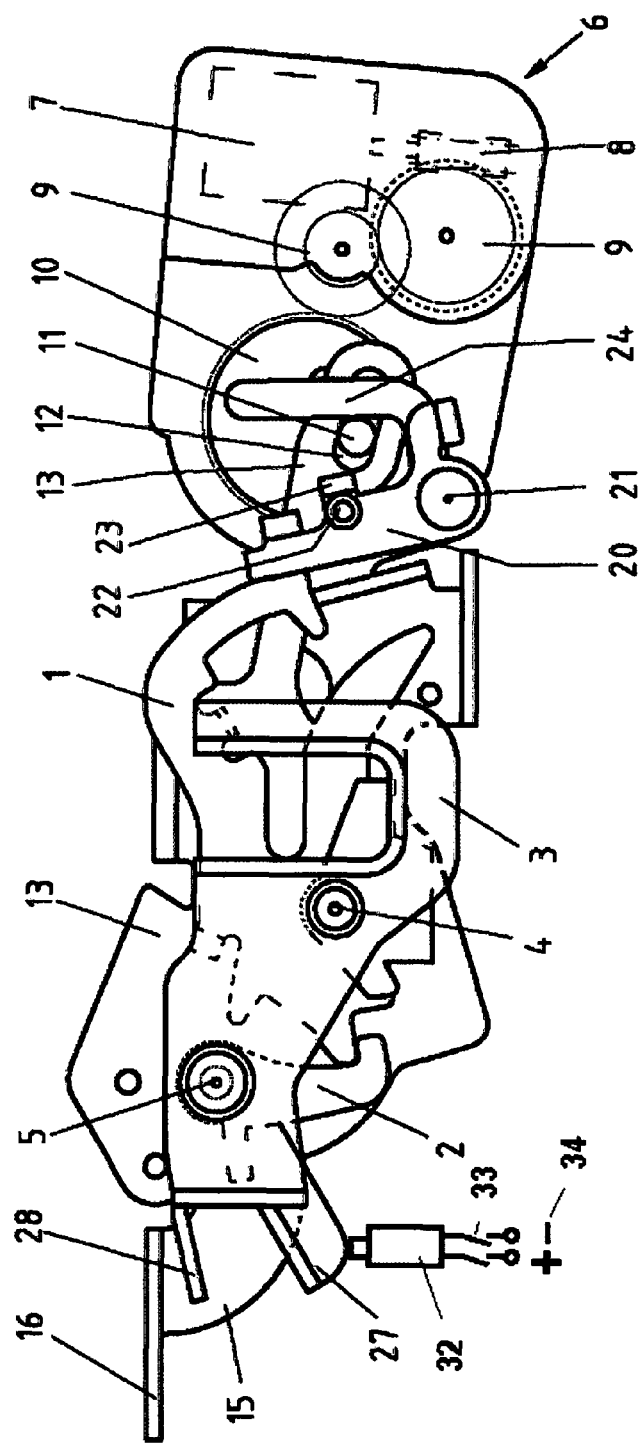

source and put the electrical drive into operation such that an associated door or flap can be opened.

12 Claims, 11 Drawing Sheets

(51) Int. Cl.
   *E05B 81/06* (2014.01)
   *B62D 25/10* (2006.01)
(58) Field of Classification Search
   CPC ......... E05B 81/62; E05B 81/64; E05B 81/66;
   E05B 83/24; E05B 83/16; E05B
   2047/005; B62D 25/10; B62D 25/105;
   B60J 7/185; B60J 7/1851; B60J 7/1853;
   B60J 7/1855; B60J 7/19; B60J 7/192;
   B60J 7/194; Y10T 292/1075; Y10T
   292/1079; Y10T 292/1082; Y10T
   292/1047; Y10S 292/14; Y10S 292/23;
   Y10S 292/42; Y10S 292/43
   USPC .............. 292/195, 199, 201, 216, DIG. 14,
   292/DIG. 23, DIG. 42, DIG. 43;
   296/193.11, 121, 224
   See application file for complete search history.

(56) References Cited

U.S. PATENT DOCUMENTS

| | | | | |
|---|---|---|---|---|
| 4,518,180 | A * | 5/1985 | Kleefeldt | E05B 81/06 292/201 |
| 4,652,027 | A * | 3/1987 | Quantz | E05B 81/14 292/201 |
| 4,746,153 | A * | 5/1988 | Compeau | E05B 81/22 292/216 |
| 4,762,348 | A * | 8/1988 | Matsumoto | E05B 81/06 292/201 |
| 4,892,340 | A * | 1/1990 | Matumoto | E05B 81/20 292/201 |
| 4,968,074 | A * | 11/1990 | Yamagishi | E05L 381/20 292/201 |
| 5,713,613 | A * | 2/1998 | Honma | E05B 77/48 292/201 |
| 6,439,623 | B1 * | 8/2002 | Lohfeld | E05B 81/20 292/201 |
| 6,557,910 | B2 * | 5/2003 | Amano | E05B 81/14 292/201 |
| 6,568,720 | B1 * | 5/2003 | Szablewski | E05B 81/14 292/201 |
| 7,059,640 | B2 * | 6/2006 | Tensing | E05B 81/14 292/201 |
| 9,080,355 | B2 * | 7/2015 | Brose | E05B 81/14 |
| 2005/0156447 | A1 * | 7/2005 | Bishop | E05B 17/0037 296/76 |
| 2010/0237632 | A1 * | 9/2010 | Browne | E05B 47/0009 292/201 |
| 2014/0088826 | A1 | 3/2014 | Wheeler et al. | |
| 2016/0090762 | A1 * | 3/2016 | Strole | E05B 81/20 292/201 |
| 2016/0340939 | A1 * | 11/2016 | Scholz | E05B 81/06 |
| 2017/0009494 | A1 * | 1/2017 | Scholz | E05B 77/08 |
| 2017/0009495 | A1 * | 1/2017 | Scholz | E05B 81/21 |

FOREIGN PATENT DOCUMENTS

| | | | |
|---|---|---|---|
| DE | 103 06 605 A1 | 8/2004 | |
| DE | 10 2004 011 798 B3 | 10/2005 | |
| DE | 10 2004 013671 A1 | 10/2005 | |
| DE | 10 2008 005 181 A1 | 7/2009 | |
| DE | 10 2009 052782 A1 | 5/2011 | |
| DE | 102014002580 A1 * | 8/2015 | ............ E05B 81/20 |
| GB | 1 287 168 A | 8/1972 | |
| WO | 2005/093195 A2 | 10/2005 | |

* cited by examiner

CLOSING DEVICE FOR A MOTOR-VEHICLE HOOD, AND METHOD

The invention relates to a closure device with a locking mechanism comprising a catch and at least a pawl for latching of the catch. The closure device encompasses an electrical drive with which the locking mechanism can be electrically opened.

The purpose of a closure device of the type initially stated is for the temporary closure of openings in motor vehicles or buildings with the aid of doors or flaps. In the closed state, the catch encompasses a bracket-shaped locking bolt in particular with two arms (known as load arm and collecting arm). In the case of a motor vehicle, the locking bolt can be attached to a door or a flap of the motor vehicle and then the latch to the chassis or vice versa.

If the catch reaches a closed position by means of pivoting starting in an open position, the catch is ultimately latched by means of the pawl. Such a pivoting is attained by the locking bolt (also referred to as "latch holder") when it engages into the catch by closure of a pertaining door or flap. A locking area of the pawl then abuts a locking area of the catch in the latched position, whereby the catch is prevented from being rotated back in the direction of the open position. The locking bolt can no longer leave the locking mechanism in the closed position.

For opening it is necessary to move the pawl out of its ratchet position. If the pawl is moved out of its ratchet position, the catch rotates in the direction of the open position. The locking bolt can leave the latch in the open position of the catch and thus in the open position of the locking mechanism. The door or flap can thus be opened again.

DE 10 2008 005 181 A1 describes a closure aid to pull a flap or a door of a vehicle towards the motor vehicle chassis. The purpose of the drive known from this is to also open the door or flap. A combined closure and electrical opening of a tailgate latch arises from the publications DE 100 33 092 A1, DE 10 2004 011 798 B3 and DE 10 2004 013 671 A1.

There is an activation device in order to open the latch. If the activation device is activated, the locking mechanism opens. A door or flap handle can be part of the activation device. This handle is generally connected to an activation lever of the latch via a rod or a Bowden cable. If the handle is activated, the activation lever of the latch is pivoted in such a way by means of the rod or the Bowden cable that the latch opens.

Insofar as not specified otherwise hereinafter, the object of the invention can demonstrate the aforementioned characteristics individually or in any combination.

With a latch of the aforementioned type, it is important that such a latch does not open in an unscheduled manner. If a latch were to open in an unscheduled manner during a trip, a front-side hood flap could then obscure a driver's view by flapping open. Airbags integrated in doors would lose their protective effects in the case of a door opening in an unscheduled manner.

It is the task of the invention to provide a closure device which can be conveniently opened and can nevertheless be manufactured at little expense and which cannot open in an unscheduled manner.

In order to solve the task, a latching device encompasses the characteristics of claim 1. Advantageous designs result from the dependent claims.

To solve this task, a closure device encompasses a locking mechanism comprising a catch and a pawl and at least an electrical drive for an opening of the locking mechanism. The closure device has an activation device for activation of the electrical drive in order to thus be able to open the locking mechanism solely electrically. There is therefore no mechanism—for example, encompassing a handle and a Bowden cable which connects the handle with a triggering lever of the locking mechanism—, in order to be able to open the locking mechanism solely mechanically, i.e. without the use of the electrical drive or another electrical device. In the non-activated state the electrical drive is completely disconnected from current-conducting electrical conductors. In particular, there is no electrical connection to a contact of a battery of a motor vehicle and/or a generator. No voltage is then applied to the drive which must necessarily be used to open the locking mechanism. The activation device is created in such a way that by means of activation one or several electrical contacts are closed in order to connect the electrical drive with a power source, to start it up in order to thus be able to open a pertaining door or flap.

The electrical drive ensures that the closure device can be conveniently opened. By dispensing with a mechanism which enables pure mechanical opening, the expense of manufacture and costs are kept low. Furthermore, risks are prevented which are connected with a mechanical method of opening a locking mechanism. It is prevented in particular that a locking mechanism can open in an unscheduled manner in a crash, for example, due to an acceleration of mechanical components. The fact that the electrical drive for opening the locking mechanism is only connected to a power source or a current-conducting electrical conductor upon activation prevents the electrical drive from being able to be started off in an unscheduled manner, for example, due to electrical malfunctions, thus for example by short-circuiting.

In one design of the invention the closure device is used for a hood latch. There is an electrical switch or an electronic control unit preferably inside the motor vehicle, with which the closure device can be activated for opening. It involves in particular the only scheduled possibility of activating the closure device for opening. In the case of a hood there is hardly a need to be able to also open this mechanically in the case of emergency. The invention is therefore particularly suited to hoods.

In one design of the invention the activation device simultaneously serves for the electrical closure of the pertaining door or flap. In particular it is only possible to completely close the door or flap with the aid of a second or the stated electrical drive. The closure device must therefore be absolutely electrically activated for closure of the pertaining door or flap. It can thus be conveniently opened and also advantageously closed conveniently or for other reasons. The stated drive can advantageously assume a dual function which reduces the cost proportionately to the benefit. An additional purely mechanical closure mechanism is preferably not present which would increase the manufacturing costs and opening risks.

In one design of the invention an activation for electrical closure of the closure device ultimately results in the scheduled closed state of the pertaining door or flap of the electrical drive being disconnected from one or several current-conducting electrical conductors which are absolutely used for opening. There is then no longer any electrical voltage on this electrical drive. The activation device therefore advantageously assumes a multitude of functions.

In one design of the invention, the drive or another electrical drive closes a hood or a door in such a way that a gap—also known as a hood gap—between the adjacent chassis and hood or door is less than 5 mm, preferably less than 3 mm, most preferably less than 1 mm and namely in the scheduled closed state of a pertaining door or flap. In contrast to mechanical closure this is possible with the aid of an electrical drive as uniform and sufficiently slow closure movements can be ensured by an electrical drive in order to reliably prevent a slamming of the hood or door on the adjacent chassis. The smaller the gap dimension of a hood gap, the smaller the disadvantageous air turbulence which can be caused by a gap during a trip.

In one design, the electrical drive or a second electrical drive reduces the hood gap in the aforementioned manner by it moving the locking mechanism completely or partially in such a way that a hood gap can be reduced. If a door or flap is therefore closed, a gap initially remains between the door and the doorframe or between a frame and the pertaining flap. By the corresponding electrical drive the locking mechanism or parts of the locking mechanism can be moved in such a way that this gap decreases. In particular in this design the hood gap thus finally reduces to a gap dimension of less than 5 mm, preferably less than 3 mm, most preferably less than 1 mm.

In one design, the closure device encompasses a closure aid in order to thus reduce an aforementioned gap by partial movement of the locking mechanism. Such a latch with a closure aid encompasses a catch which can be latched in both a pre-ratchet position and also a main ratchet position by at least a pawl. The relevant electrical drive pivots the catch from the pre-ratchet position into the main ratchet position.

In an especially advantageous design, the latch with a closure aid has a securing mechanism which prevents the locking mechanism being manually moved into the main ratchet position. Thus, a stop can be provided for a locking bracket which prevents the locking bracket being able to be moved far by the closure of a door or flap into the infeed section of a catch in such a way that the catch can be latched in the main ratchet position. If the locking mechanism is latched by a pawl in the pre-ratchet position, this position is registered, for example, by a microswitch by activation. If a microswitch registers the pre-ratchet position, the microswitch is thus activated. The activation of the microswitch then starts off the electrical drive. The drive moves the stop out of its stop position. Subsequently, the catch is rotated in the direction of the main ratchet position by an electrical drive until the catch is latched in the main ratchet position.

This design is generally based on the consideration of providing a latch for gap minimization which can be latched by at least one pawl in a pre-ratchet position and a main ratchet position. There is a closure aid in order to latch the locking mechanism in its main ratchet position starting from the pre-ratchet position. Furthermore, there is a securing mechanism which causes the latch to be latched in the main ratchet position only with the aid of the electrical drive.

This design ensures that the catch cannot be pivoted to the main ratchet position at excessively high speed. This thus prevents the attainment of an excessively large overstroke position of the catch which could cause damage to the adjacent chassis. Compared to the usual latches with a pre-ratchet position and a main ratchet position, a gap between a flap or a door and a chassis can therefore be minimized as it can be configured in such a way that only a very small overstroke is possible. It is thus possible in particular to reduce the gap dimension to 4 mm and less. It is even possible to attain a gap dimension of 3 mm and less, preferably less than 1 mm.

In one design of the invention the relevant electrical drive moves the locking mechanism fully or partially following a latching in the main ratchet position in such a way that a hood gap is advantageously reduced. Small gap dimensions can thus be attained without an adjacent chassis being able to be damaged.

The invention relates in particular to a design in which a mechanical switch or a relevant control unit is present inside a vehicle with which a hood latch can be activated. The electrical activation unit (switch, control unit or similar) is used to shut off the electrical power supply for the hood latch. i.e. in the closed state of the motor vehicle hood no voltage is applied to the relevant drive of the hood latch and the electrical circuit is only closed in the case of activation.

The closure of the electrical circuit can either occur directly by the switching device itself, i.e. a mechanical switch such as a push button, etc. or alternatively the electrical circuit is closed by means of the activation device, for example a relay, an electrical switch or an appropriate switching device. Consequently, only at this time is the relevant drive of the hood latch supplied with power. Such a measure fulfils the need that in the case of an incorrect, unwanted activation, a defective control device opens a hood in an unscheduled manner.

Figure 2:
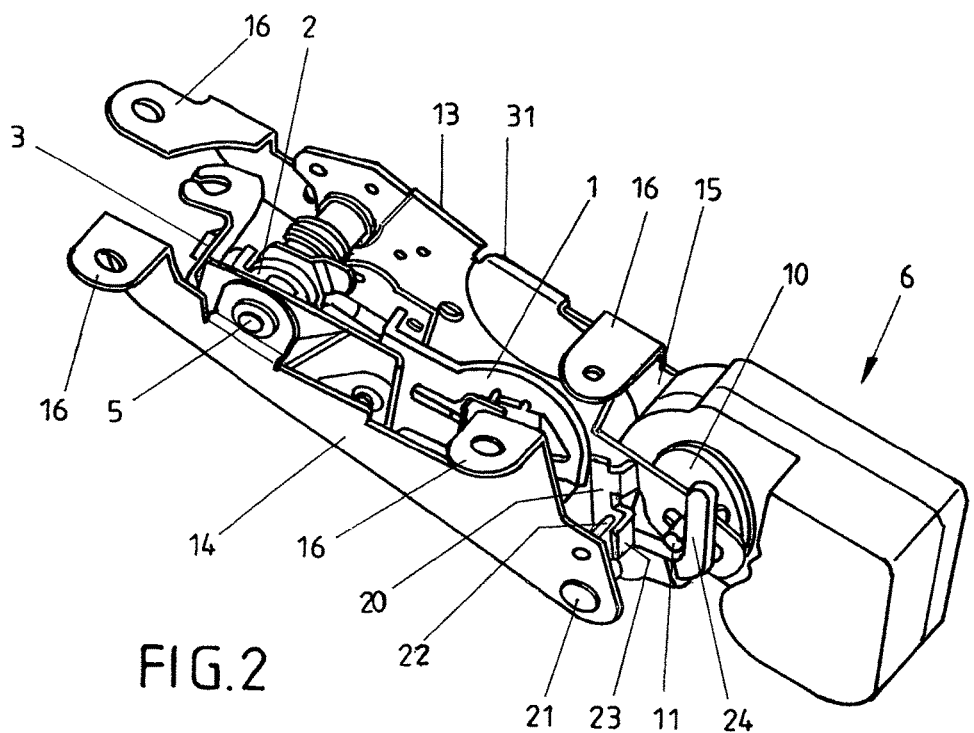
Figure 3:
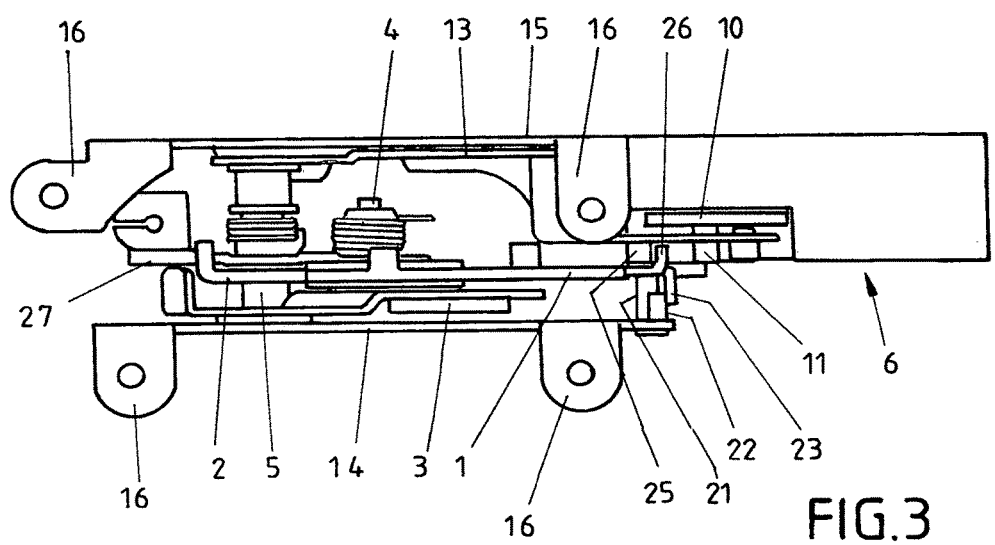
Figure 4:
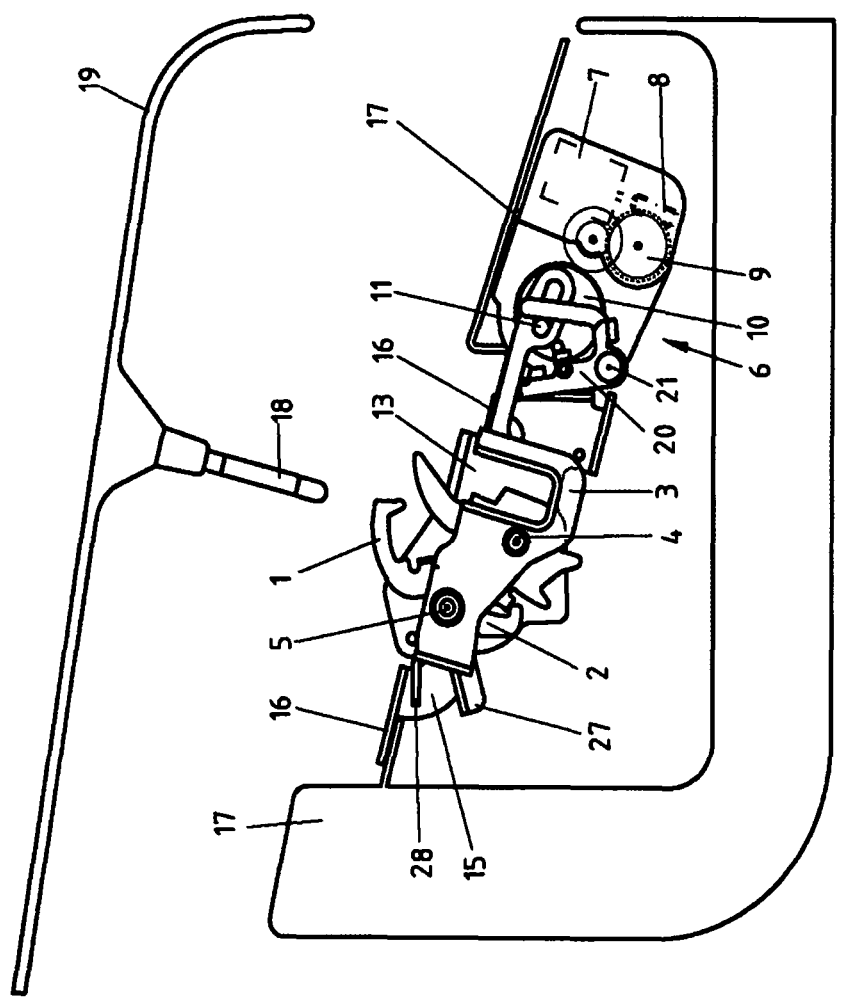
Figure 5:
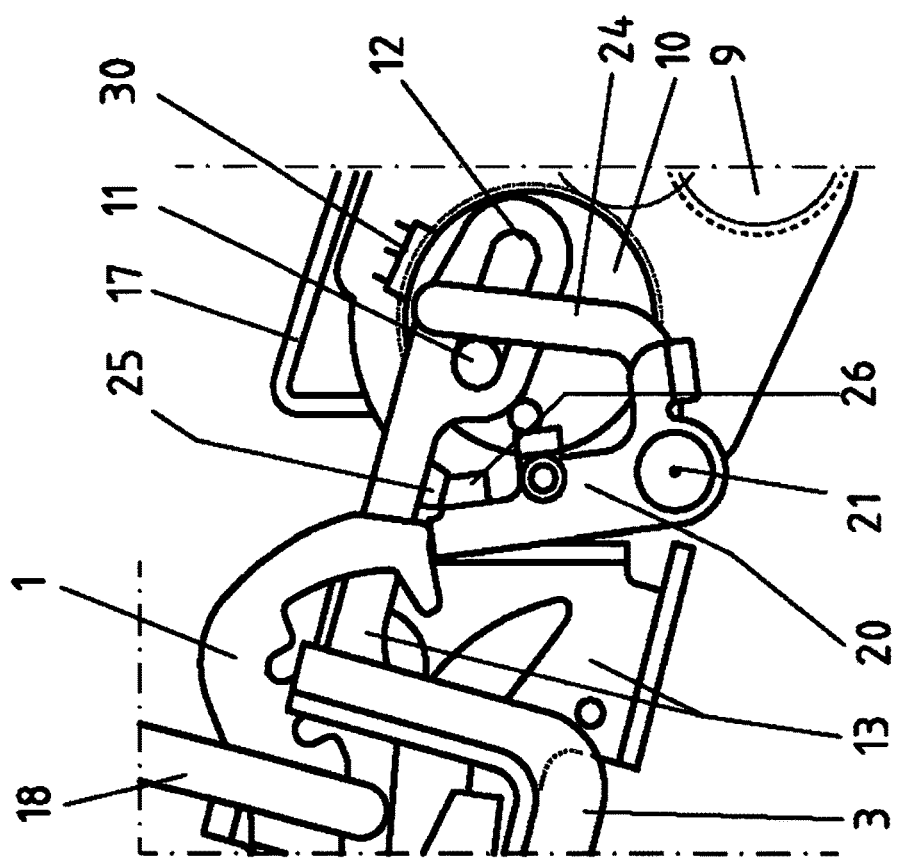
Figure 6:
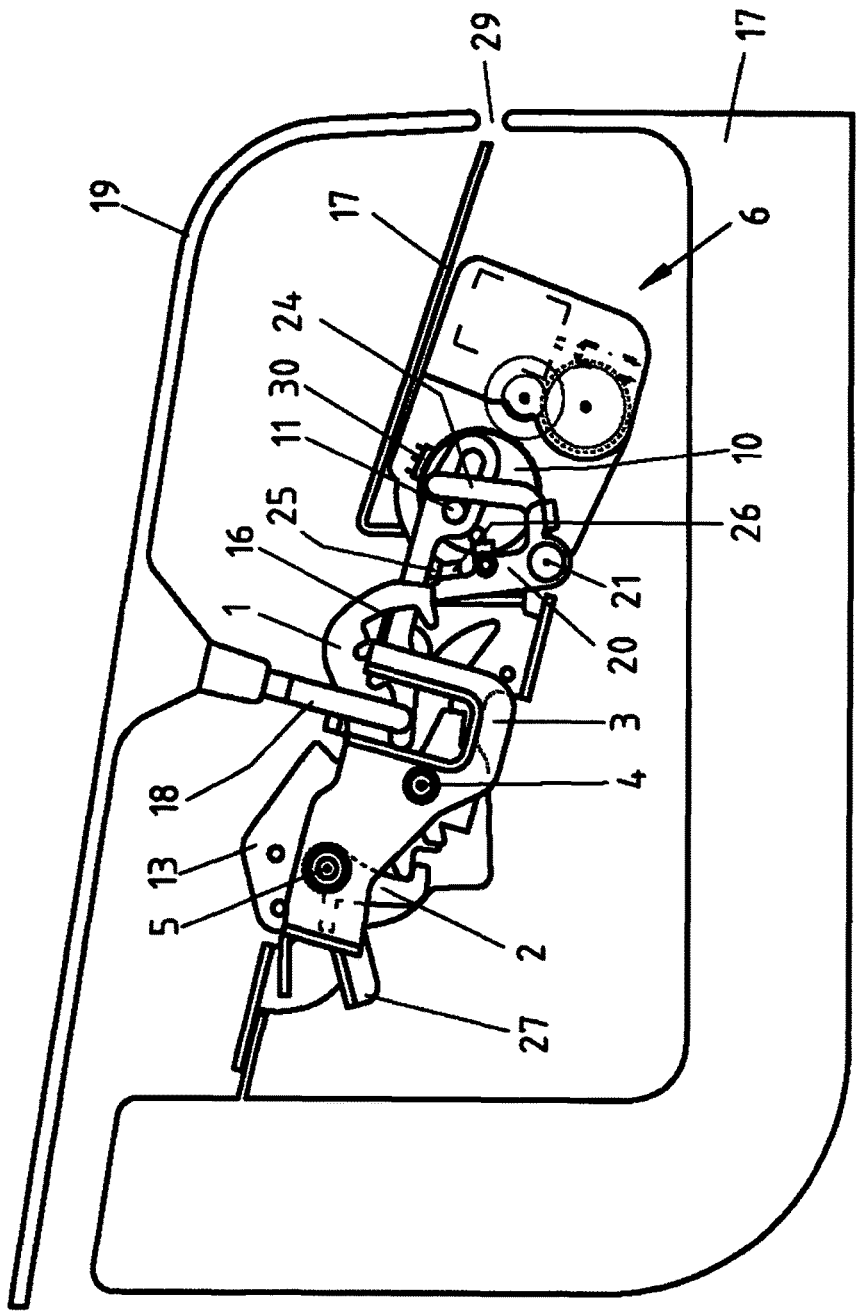
Figure 7:
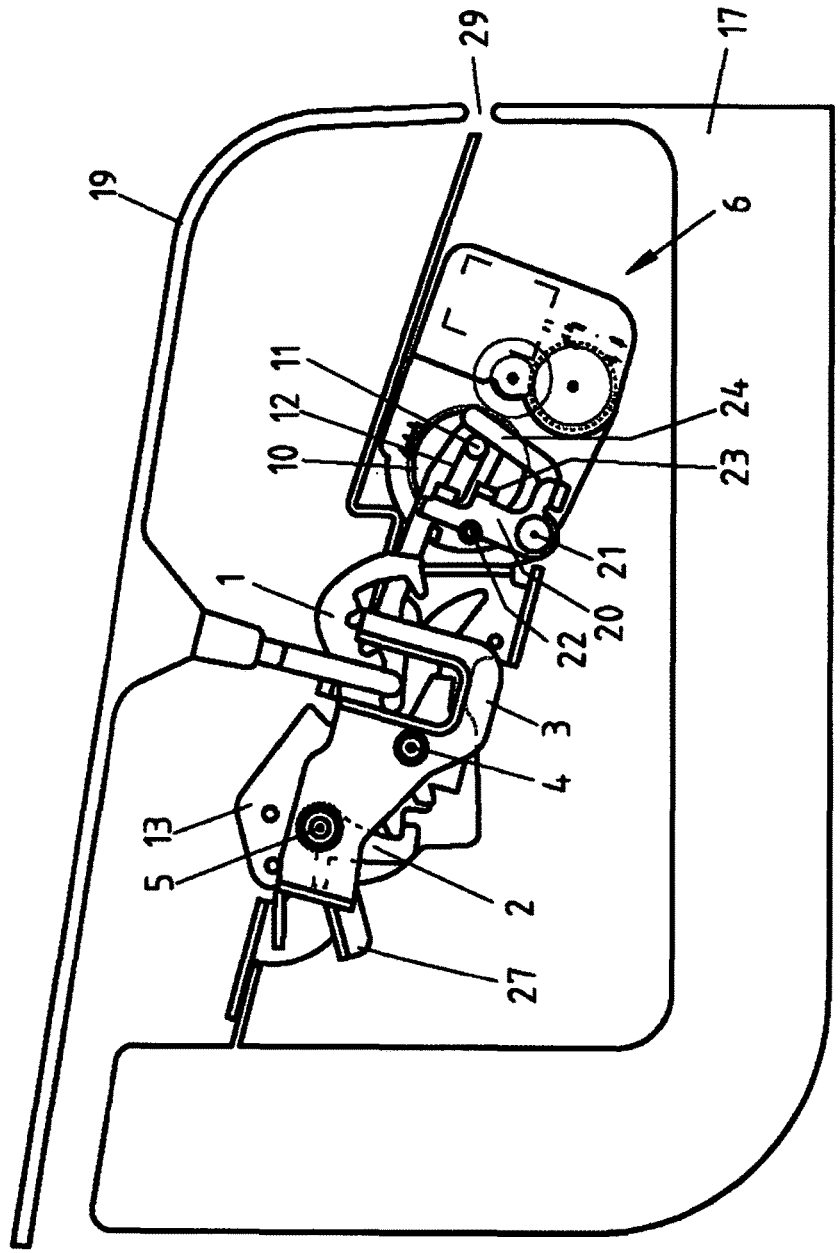
Figure 8:
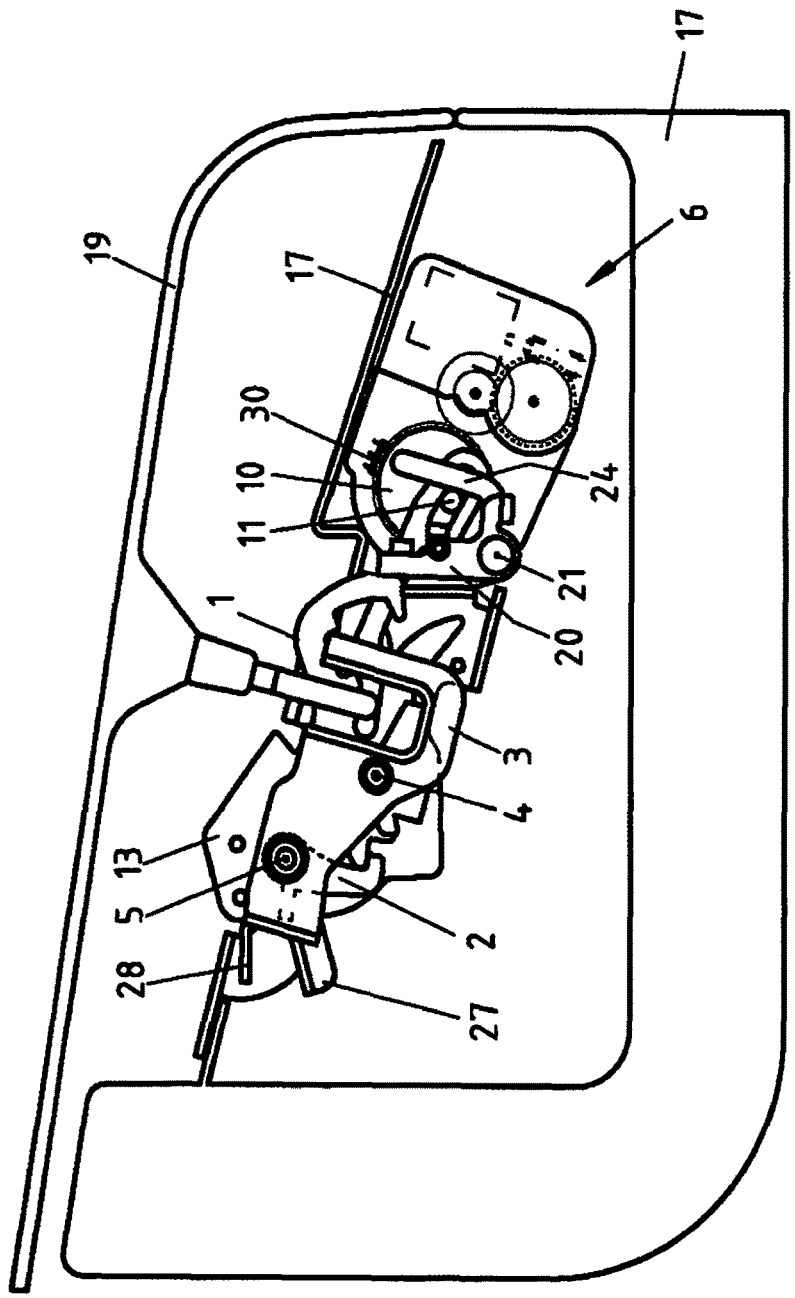
Figure 9:
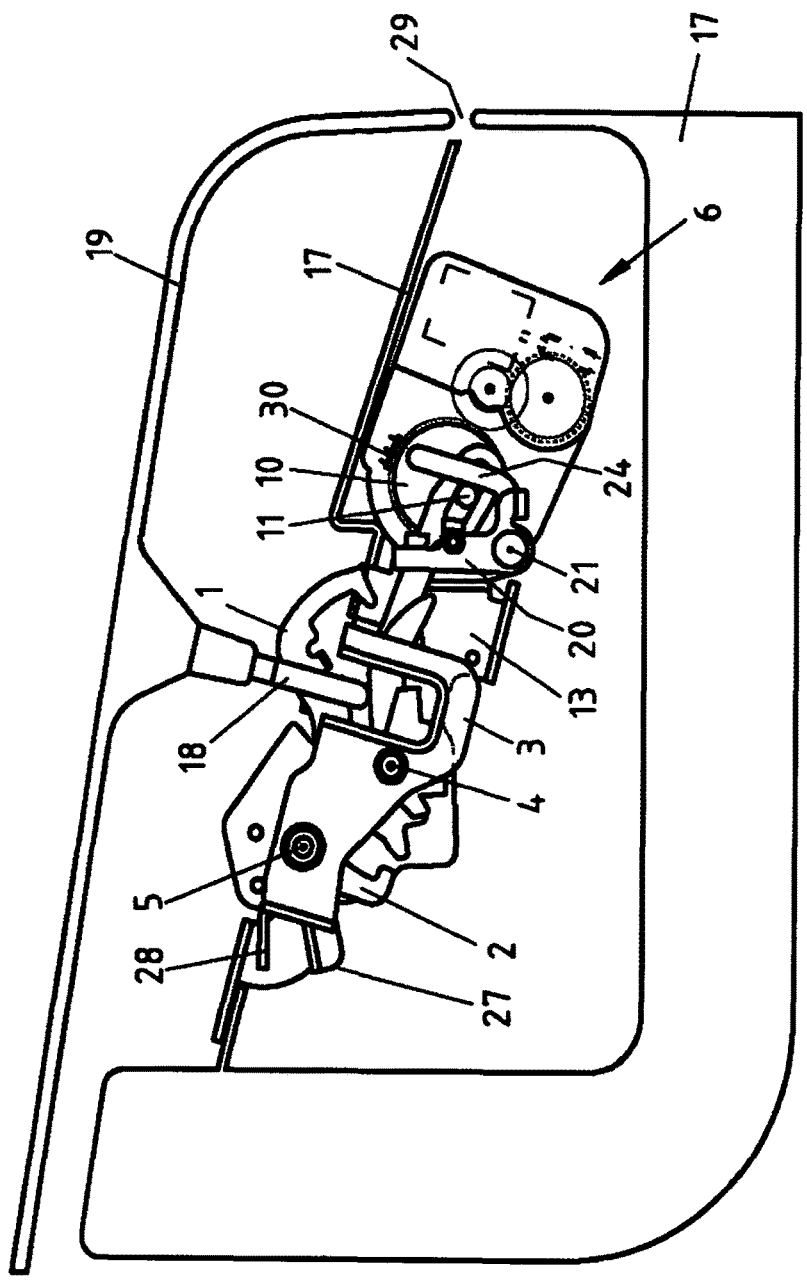
Figure 10:
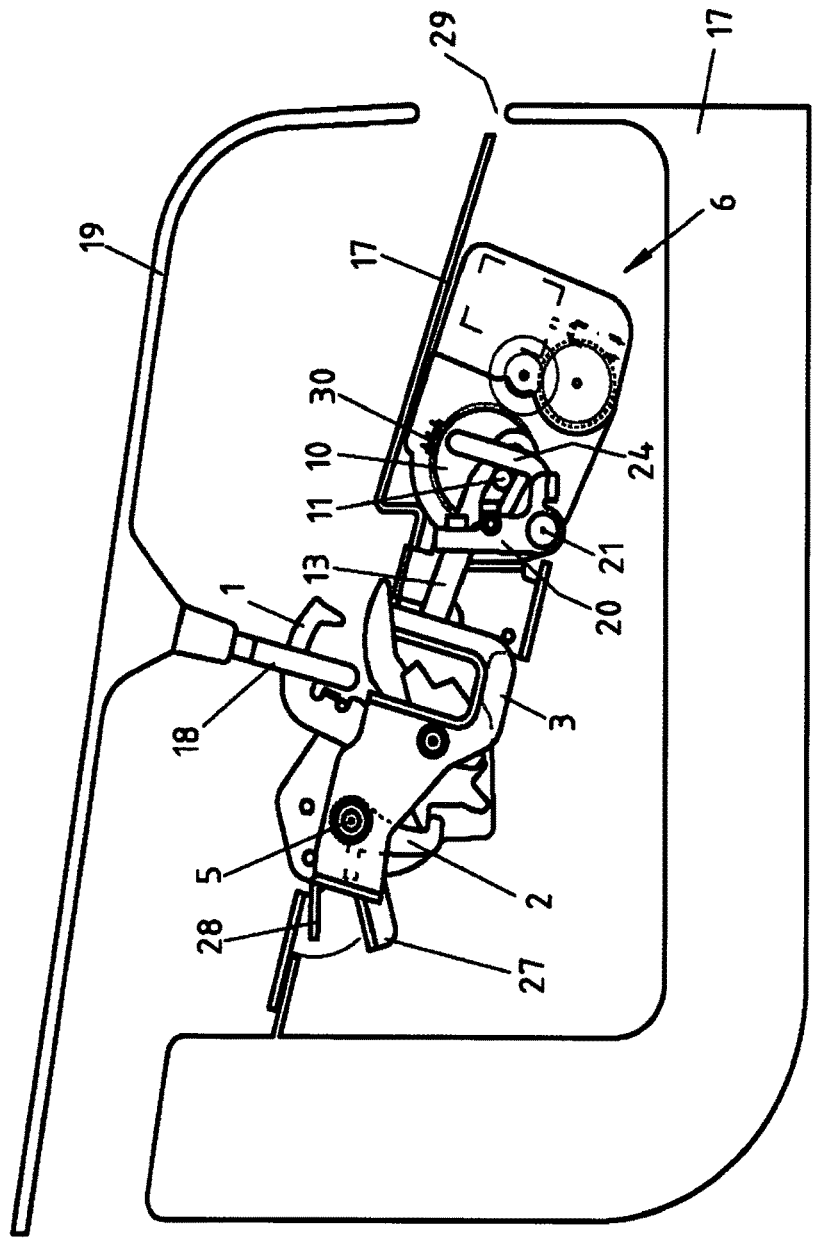
Figure 11:
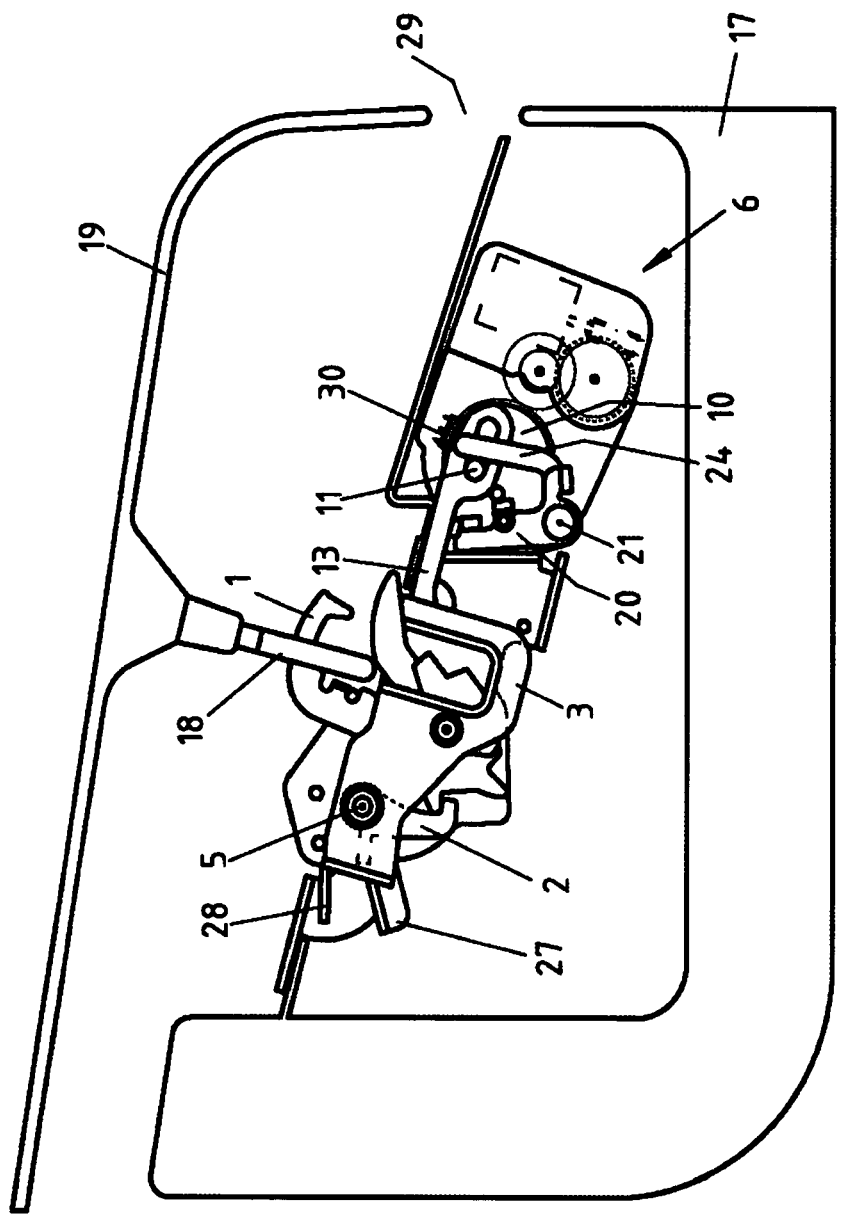
Figure 12:
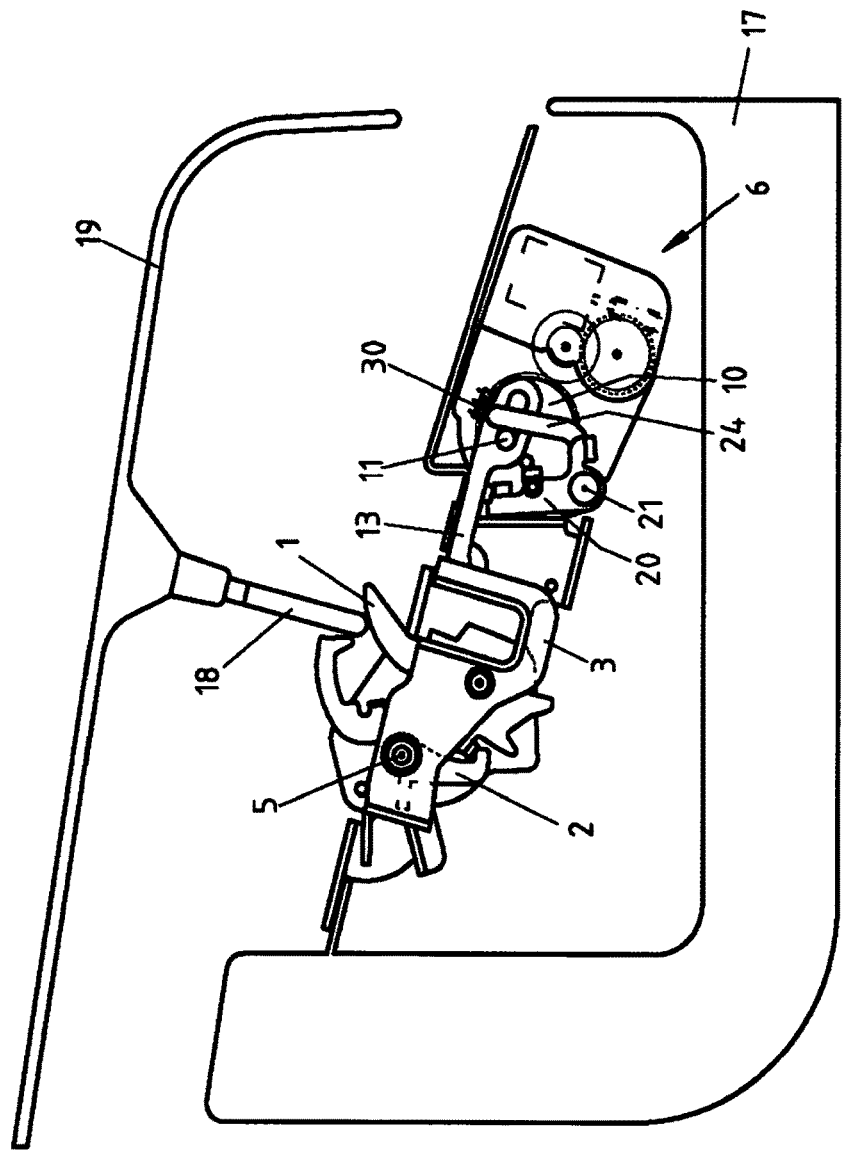

The following are shown:

FIG. 1: Latch structure in the latched state (main ratchet);
FIG. 2: Perspective view of the latch;
FIG. 3: Top view of the latch;
FIG. 4: Integral latch and hood;
FIG. 5: Enlarged view of a section in the case of the impingement of the catch on the stop of the latch;
FIG. 6: Initial closure of the hood with remaining gap;
FIG. 7: Continuation of the closure process;
FIG. 8: Complete closure of the hood;
FIG. 9: Initial opening of the hood;
FIG. 10: Continuation of the opening of the hood;
FIG. 11: Hood with latching of the catch in the pre-ratchet position;
FIG. 12: Complete opening of the hood;

FIG. 1 illustrates the structure of a closure device for a hood 19 of a vehicle. The closure device has a locking mechanism comprising a catch 1 and a pawl 2. The catch 1 can be latched in a closed position with the pawl 2 as shown in FIG. 1. The pawl 2 is pivotably located on a plate 3 by an axis 5. The catch 1 is pivotably located on the plate 3 via its axis 4. For stability reasons, the plate 3 is preferably made of metal. The pawl 2 and/or the catch 1 are preferably also made completely or partially of metal.

With a drive 6 the locking mechanism consisting of the catch 1 and the pawl 2 can be moved in such a way that a door gap or flap gap can be reduced. The drive 6 can simultaneously serve to open the pertaining door or flap. For this purpose, the drive 6 has an electromotor 7 and a worm 8 connected with the shaft of the motor. The motor 7 can cause a rotational movement of the worm 8. By means of a preferably multistage gearbox 9 provided for, a rotational movement of the worm 8 causes a rotational movement of a disk 10. A bolt 11 protrudes vertically from the disk 10. The bolt 11 is attached to the disk 10. The bolt 11 has a distance to the rotational center of the disk 10 and is therefore arranged excentrically. The bolt 11 reaches into a lengthwise hole 12 of a pivotably located lever or swing lever 13. The swing lever 13 is pivotably located by the axis or shaft 5. A rotation of the disk 10 thus causes the swing lever 13 to pivot.

The lever 13 and the plate 3 are rigidly connected to the shaft 5. Pivoting of the lever 13 synchronously causes a pivoting of the plate 3.

Viewed from the shaft 5 the plate 3 and the swing lever 13 extend in the same direction, preferably in the direction of the drive 6 in order to minimize construction space. The swing lever 13 extends beyond the plate 3, in particular beyond the infeed section of the plate 3, i.e. beyond the area into which a locking bolt 18 reaches when the hood 19 is closed. Favorable lever ratios are hereby provided in order to be able to pivot the swing lever 13 with little electrical output for reduction of a hood gap.

Furthermore, the closure device encompasses a first plate 14 illustrated in FIGS. 2 and 3. For stability reasons, there is preferably a second plate 15 on the opposite side. Both plates 14 and 15 pivotably mount the axis or shaft 5. For stability reasons, the plate(s) 14 and 15 are preferably made of metal. The one or two plates 14 and 15 are affixed with the aid of deflected brackets furnished with holes 16 on the vehicle with grooves or screws, for example, on a door, a flap or a chassis. If the one or two plates 14 and 15 are attached to the vehicle chassis 17 as shown in FIG. 4, the pertaining locking bolt 18 (see FIG. 4) is attached to the door or flap 19. FIG. 4 shows the case of attachment to a front hood of a motor vehicle. The drive 6 is affixed to the plate 15. One of the plates 14 or 15 therefore preferably also serves as an attachment to the drive 6, in order to thus minimize the number of components.

The closure device encompasses a bridge-shaped stop 20 which is pivotably attached preferably to the plate 14 by an axis or shaft 21. A bolt 22 protrudes in particular vertically from the plate 14 which is capable of restricting a pivoting movement of the stop 20 (see FIGS. 2 and 3). The bridge-shaped stop 20 has a preferably deflected bracket 23 which can be moved by pivoting against the bolt 22 in order to prevent continuation of a relevant pivoting movement by attainment of the bolt 22, as illustrated in FIGS. 1, 2 and 3.

Originating from the axis or shaft 21, a bracket 24 extends which controls the movement of the stop 20. Together with the stop 20 the bracket 24 practically forms a U-shape. The bracket 24 basically abuts the bolt 11. If the disk 10 is rotated, the bracket 24 is thus also moved due to the bolt 11. The movement of the bracket 24 causes a relevantly synchronous movement of the stop 20.

The stop 20 not only acts as a stop for the catch 1, but also as a stop for the swing lever 13 when the locking bolt 18 engages into the latch. In order that the stop 20 then also constitutes a stop for the swing lever 13, both the stop 20 and the swing lever 13 have suitably deflected brackets 25 and 26. If the locking bolt 18 engages into the latch, the deflected bracket 25 of the swing lever 13 impinges on the deflected bracket 26 of the stop 20, as illustrated in the enlarged excerpt in FIG. 5. FIG. 5 furthermore illustrates the impingement of one end of the arm of the catch 1 on the end of the stop 20. In this design, two paths are therefore present in order to introduce a load into the plate 14 during closure and thus preserve the drive 6.

The latch furthermore possesses a triggering lever 27 which is also pivotably mounted by the axis or shaft 5. The triggering lever 27 is triggered by a second electrical drive 32 and/or by the drive 6 by means of a non-illustrated mechanism. By activation or closure of a switch 33, the drive 32 is connected to a power source 34, the drive 32 is started off and the pawl 2 thus moved out of its ratchet position in order to subsequently be able to open a door or a flap. The drive 32 can be an actuator which is capable of moving a bolt out of the drive in a linear manner. The switch 33 can be arranged inside a motor vehicle.

For example, FIG. 3 shows that the axes/shafts can be equipped with springs in order to be able to move the pivotable components using spring force, thus for example the catch 1 from a closure position in the direction of the opening position.

FIG. 6 illustrates the situation following an engagement of the locking bolt 18 into the latch. One arm of the catch 1, namely the so-called load arm is supported on the stop 20. The bracket 25 of the swing lever 13 is supported on the bracket 26 of the stop 20. The catch 1 has been latched by the pawl 2 and is located in the main ratchet. A gap 29 remains between the hood 19 and the chassis 17 of the vehicle. The disk 10 of the drive 6 is located in a starting position. In one design, the bolt 11 is located above the rotational center of the disk 10 in a starting position.

However, in one design it is also possible for the catch 1 to be latched by engagement of the locking bolt 18 initially only in the pre-ratchet position shown in FIG. 10. Only after the moving away of the stop 20 out of its stop position can the catch be pivoted into the main ratchet position by an electrical drive in particular by the electromotor 7 alongside a non-illustrated mechanism and/or by the drive 32. In this design, the gap 29 can be reduced to 2 mm to 4 mm by attainment of the main ratchet position.

In order to further reduce the gap 29 now starting from the main ratchet position of the locking mechanism, the disk 10 is rotated in a clockwise direction with the aid of the drive 6. Hereby, the bolt 11 shifts within a lengthwise hole 12 by rotation through 90 degrees initially from one left lengthwise hole side to the other right lengthwise hole side, as illustrated by the comparison of FIGS. 6 and 7. By rotation in the clockwise direction, the stop 20 is initially moved out of its stop position with the aid of the bracket 24 by pivoting in the clockwise direction. If the stop 20 has been moved out of its stop position, the swing lever 13 and thus also the plate 3 can now be pivoted in a clockwise direction around its axis or shaft 5 in order to further decrease the gap 29 in order to finally generate gap-free contact between the motor hood 19 and the chassis 17 on the front side as shown in FIG. 8. If the disk 10 is rotated further in a clockwise direction and if the disk 10 completes an approximately 180° rotation, the gap finally disappears as illustrated in FIG. 8.

For example with the aid of a microswitch 30 the position of the disk 10 is queried. If the disk 10 has attained the position shown in FIG. 8, this is detected by the microswitch 30 and the drive is stopped. In addition, the drive 32 only illustrated in FIG. 1 is disconnected from the power source 34. Alternatively or additionally, the position respectively attained can be detected by electricity detection (power for the electromotor) and suitably switched. One or several further microswitches can be provided for in order to detect the position of the catch 1 and/or pawl 2, for example, and to control the latching and/or opening of the locking mechanism dependent thereon. However, in one design it can also be necessary to activate the switch 33 in order to be able to close it in a scheduled manner. At the same time, this activation of the switch 33 can cause a closure that disconnects the drive 32 from the power source 34.

FIGS. 9 to 12 illustrate the opening and in particular the procedural process during opening of the hood 19. Firstly, the pawl 2 is electrically moved out of its ratchet position using the drive 32, as shown in FIG. 9. This happens by activation of the triggering lever 27 which is pivoted in a clockwise direction around its axis or shaft 5 by means of the drive 32. The catch 1 can then pivot in an anti-clockwise direction, whereby the hood 19 is initially opened. A gap 29 occurs. The catch 1 now latches in a pre-ratchet position as illustrated in FIG. 10. In turn, the latching in the pre-ratchet position is attained with the aid of the pawl 2. The position attained in FIG. 10 can be queried by, for example, a microswitch or a sensor. Hereby the drive 6 can be started in such a way that the disk 10 now rotates approximately 180° in an anti-clockwise direction. The position shown in FIG. 11 is thus attained. Subsequently, the pawl 2 is pivoted out of its pre-ratchet position. This can occur by an electrical drive which is controlled by sensors in order to open the latch electrically. The catch 1 can then pivot further in the direction of the opening position and finally release the hood 19, as illustrated in FIG. 12.

The swing lever 13 can have a deflected bracket 31, as shown in FIG. 2. The bracket 31 can be placed on an upper edge of the plate 15 when the disk 10 is rotated by approximately 180° from its starting position. A suitable path limitation can thus also be ensured for the pivoting of the swing lever 13.

The swing lever 13 can have a step-shaped course as shown in FIG. 2 in order to reach the disk 10 and minimize the construction space.

REFERENCE SIGN LIST

1: Catch
2: Pawl
3: Plate
4: Catch axis
5: Axis for the pawl inter alia
6: Drive
7: Electromotor
8: Worm
9: Gearbox
10: Disk
11: Bolt of the disk
12: Lengthwise hole of a swing lever
13: Swing lever
14: Plate for a stop
15: Plate
16: Bracket
17: Chassis
18: Locking bolt
19: Hood
20: Stop
21: Axis or shaft of the stop
22: Plate bolt
23: Bracket
24: Stop bracket
25: Deflected bracket of the swing lever
26: Deflected bracket of the stop
27: Triggering lever
29: Gap between the hood and chassis
30: Microswitch
31: Deflected bracket of the swing lever
32: Electrical drive
33: Electrical switch
34: Power source

The invention claimed is:

1. A closure device having an opening state of operation and a closing state of operation, the closure device comprising:
a locking mechanism having a catch and a pawl, the locking mechanism moveable between an open position, a pre-ratchet position, and a main ratchet position;
a first electrical drive that is operable in a first direction to move the locking mechanism from the pre-ratchet position towards the main ratchet position during the closing state of operation, and is operable in a second direction opposite the first direction to move the locking mechanism from the pre-ratchet position towards the open position;
a second electrical drive that moves the locking mechanism from the main ratchet position towards the pre-ratchet position during the opening state of operation; and
an activation device that initiates the opening state of operation, the activation device having a power source for activation of the second electrical drive during the opening state of operation, wherein during the opening state of operation, the second electrical drive is connected to the power source, wherein the second electrical drive is disconnected from the power source when the locking mechanism is in the main ratchet position,
wherein the locking mechanism can only be moved to the open position electrically.

2. The closure device according to claim 1, wherein the activation device is an electrical switch.

3. The closure device according to claim 1, wherein the first electrical drive is activated after the locking mechanism has moved to the pre-ratchet position during the closing state of operation.

4. The closure device according to claim 1, wherein the power source includes current-conducting electrical conductors and the second electrical drive is disconnected from the current-conducting electrical conductors when the locking mechanism is in the main ratchet position.

5. The closure device according to claim 1, wherein the closure device is arranged between a hood or a door for a vehicle and an adjacent chassis to the hood or the door, wherein during the closing state of operation the first electrical drive is activated to reduce a gap between the adjacent chassis and the hood or the door to less than 1 mm.

6. The closure device according to claim 1 further comprising a closure aid, wherein the locking mechanism is shifted from the pre-ratchet position to the main ratchet position using the closure aid.

7. The closure device according to claim 6, wherein the closure aid includes a stop for the catch, and wherein the stop has a stop position, in which the stop prevents the locking mechanism from being manually moved to the main ratchet position.

8. The closure device according to claim 7, wherein the stop is moved out of the stop position by the second electrical drive when the locking mechanism has been latched in the pre-ratchet position.

9. A hood comprising the closure device according to claim 1.

10. The hood according to claim 9, wherein at least one of the first electrical drive and the second electrical drive can move the locking mechanism completely or partially to reduce a hood gap.

11. The hood according to claim 10, wherein the hood gap in the main ratchet position is not more than 1 mm.

12. A method for the closure of a locking mechanism for a hood latch of a motor vehicle, in which a closure device, according to claim 1, is used.

* * * * *